Figure 1:
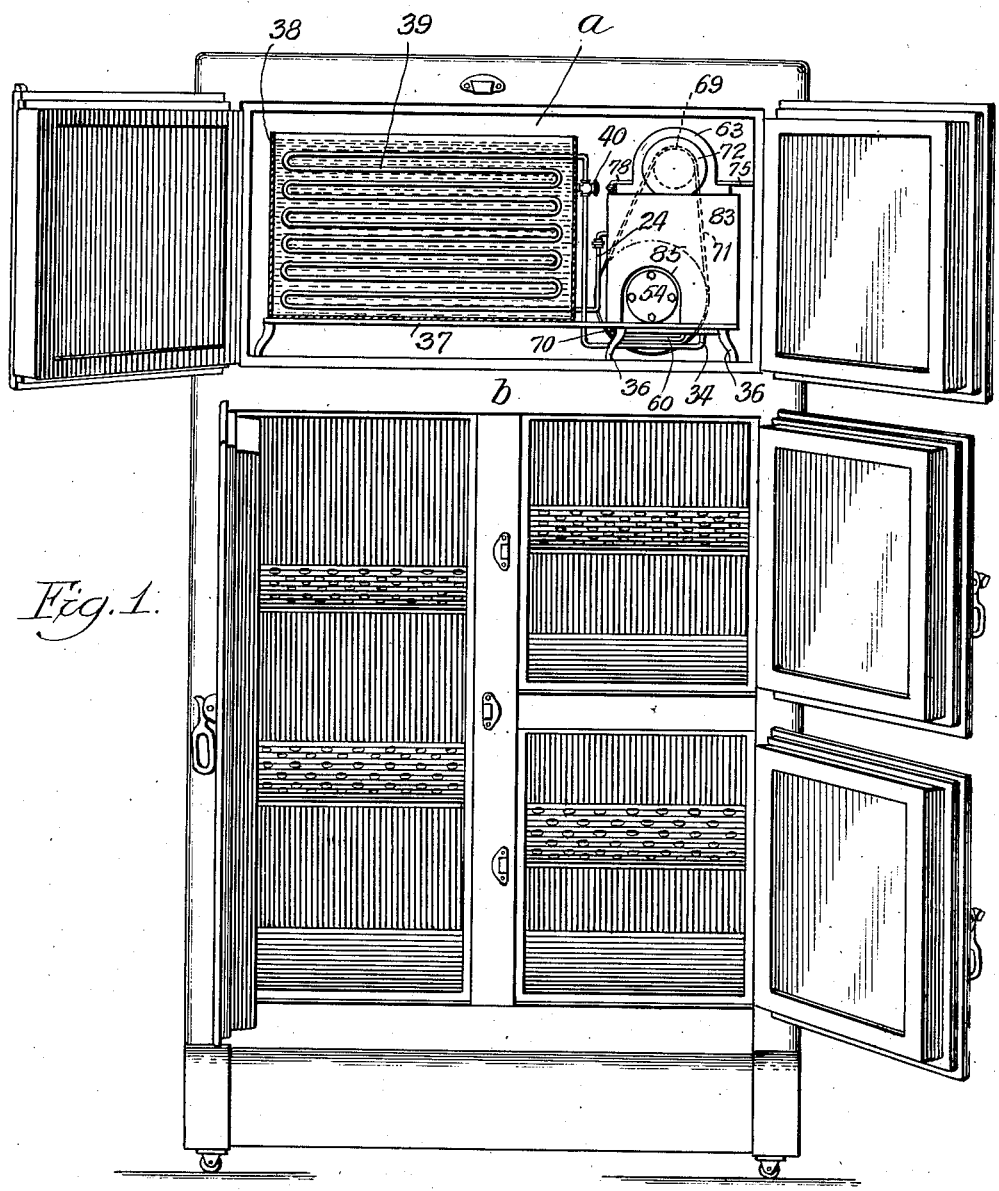

A. P. ANDERSON.
REFRIGERATING APPARATUS.
APPLICATION FILED SEPT. 28, 1916.

1,307,431.

Patented June 24, 1919.
5 SHEETS—SHEET 1.

Witness:
John Enders

Inventor:
August P. Anderson
by Fred Gerlach
his Atty.

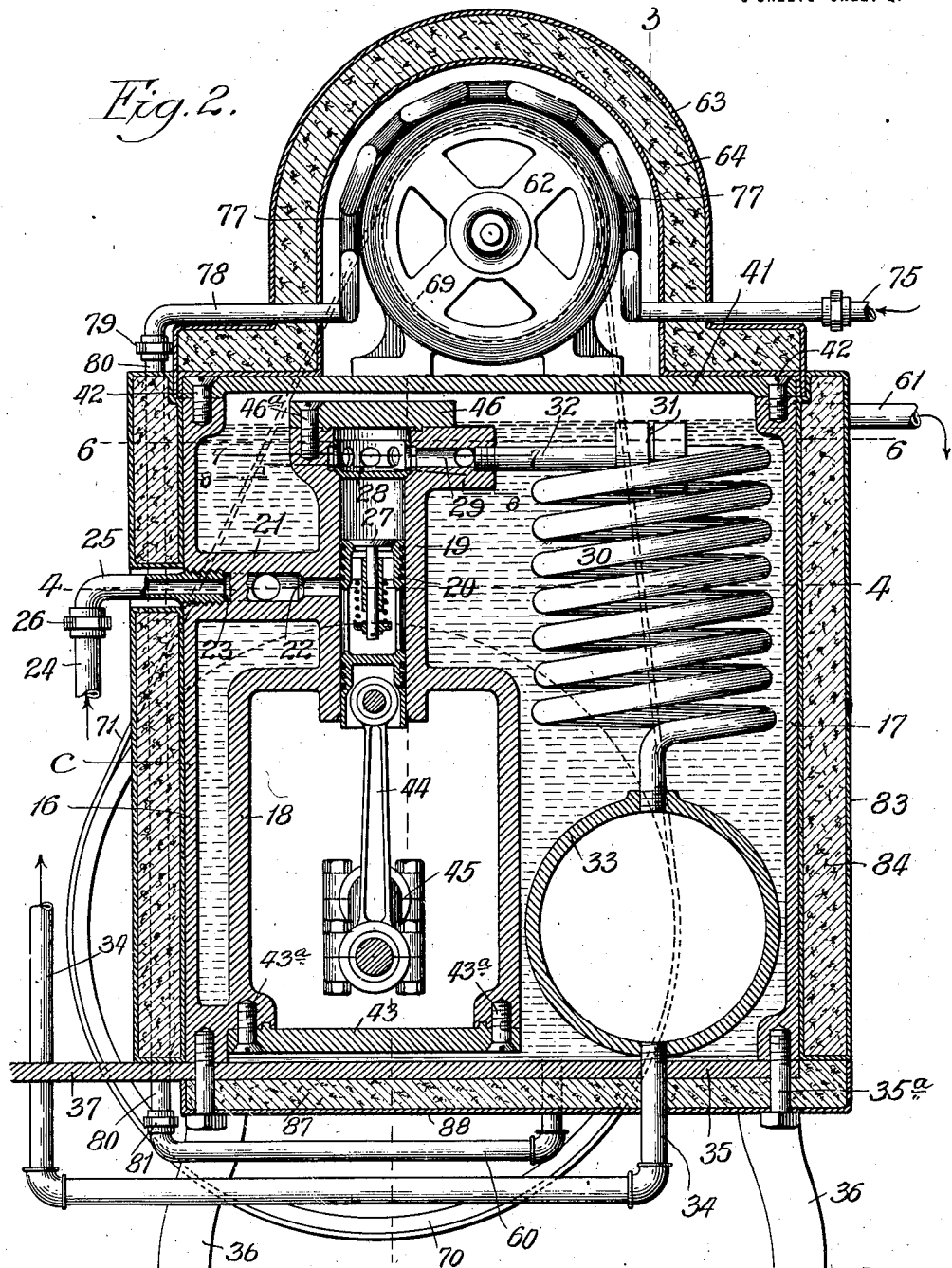

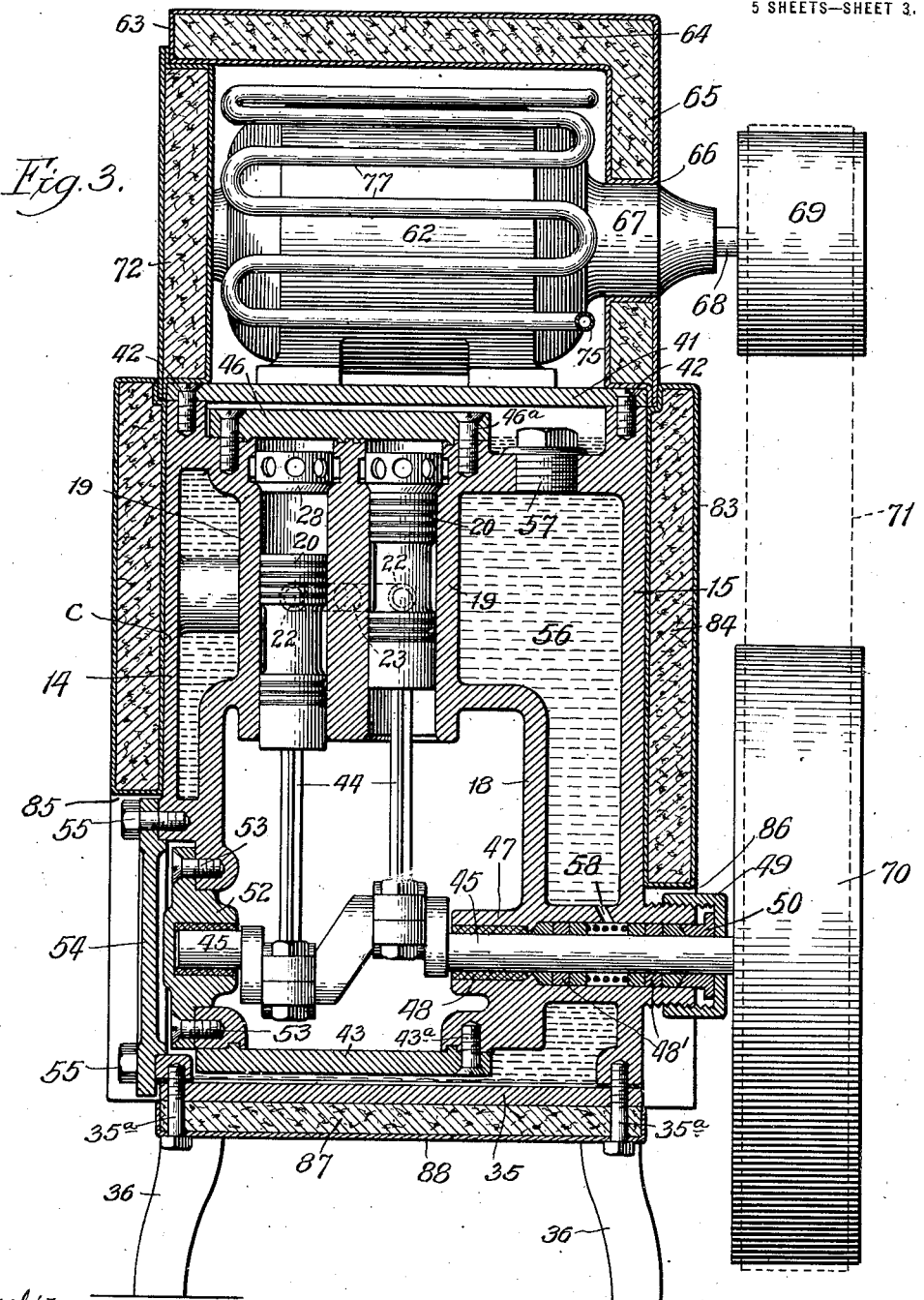

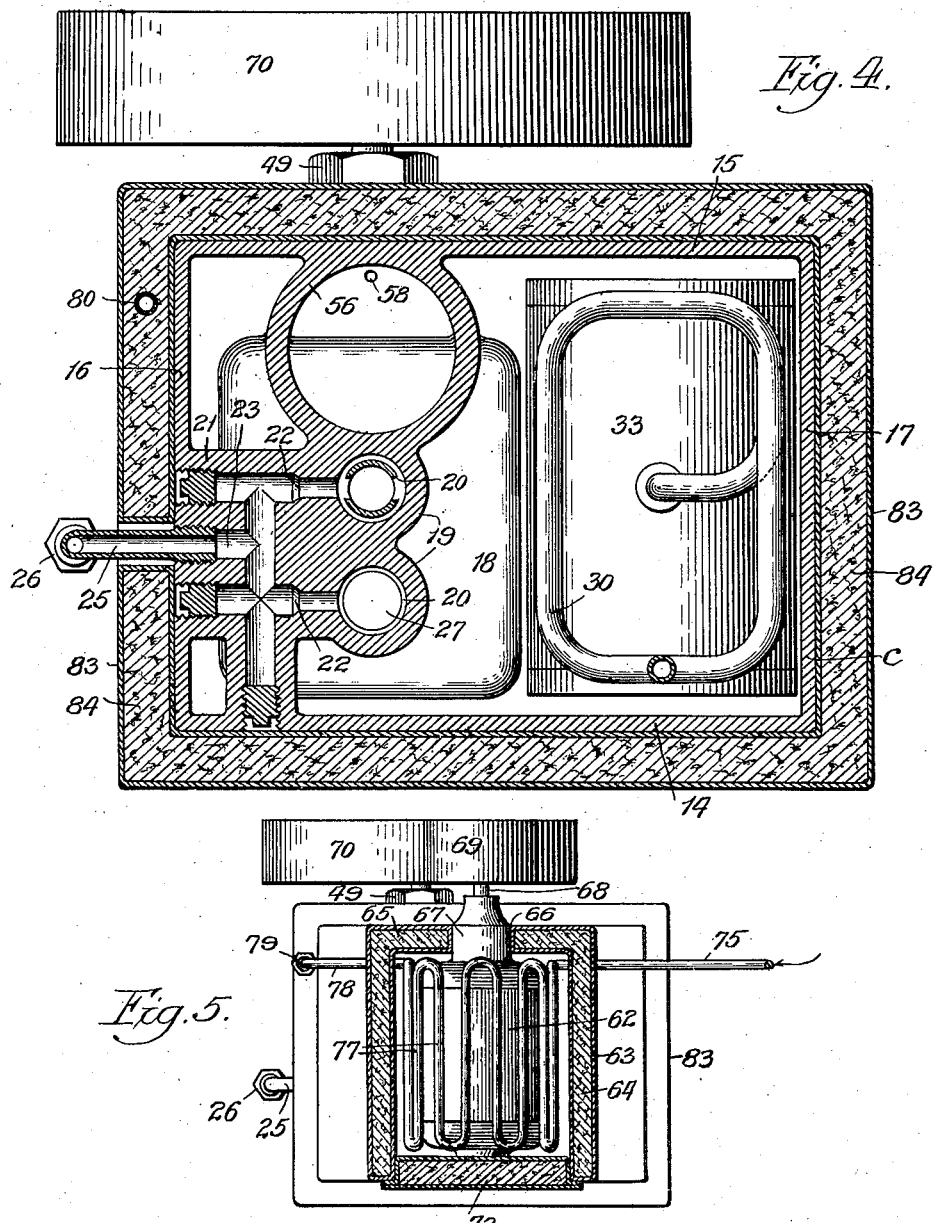

A. P. ANDERSON.
REFRIGERATING APPARATUS.
APPLICATION FILED SEPT. 28, 1916.
1,307,431.
Patented June 24, 1919.
5 SHEETS—SHEET 5.
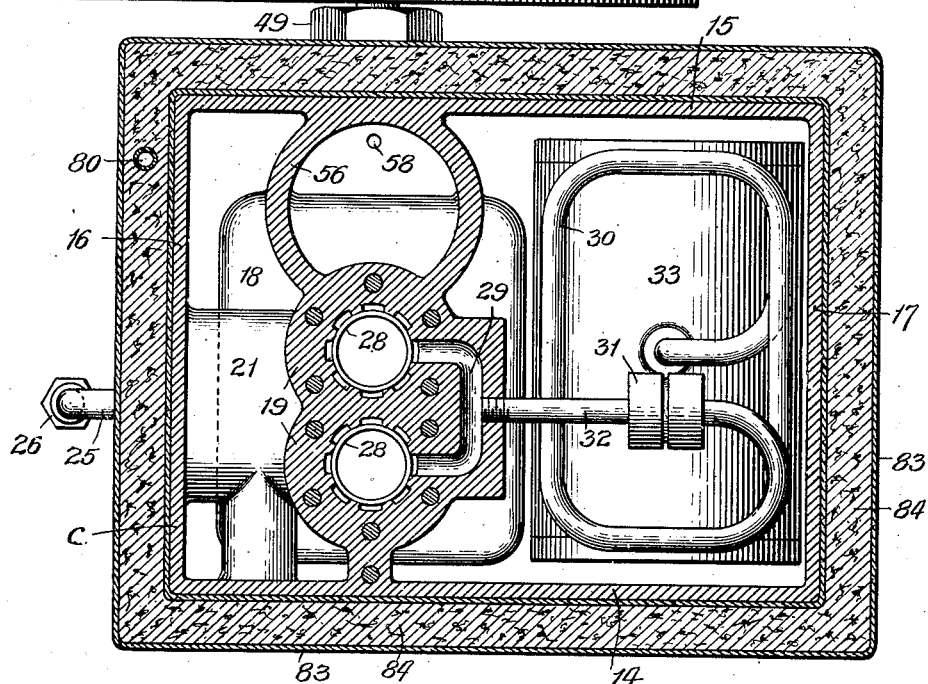

UNITED STATES PATENT OFFICE.

AUGUST P. ANDERSON, OF CHICAGO, ILLINOIS.

REFRIGERATING APPARATUS.

1,307,431.  Specification of Letters Patent.  Patented June 24, 1919.

Application filed September 28, 1916. Serial No. 122,588.

*To all whom it may concern:*

Be it known that I, AUGUST P. ANDERSON, a citizen of the United States, and a resident of Chicago, in the county of Cook and State of Illinois, have invented certain new and useful Improvements in Refrigerating Apparatus, of which the following is a full, clear, and exact description.

The invention relates to refrigerating apparatus.

One object of the invention is to provide an improved construction for refrigerating machines which is adapted to be located in the space to be refrigerated or in connection with such space, for example, in one of the chambers of a refrigerator.

A further object of the invention is to provide apparatus in which the compressor and other parts are made integral with the inclosing case to reduce and amplify the connections for the operating-parts.

A further object of the invention is to provide an improved construction in which the compressor, condenser and refrigerant receiver are all disposed within an inclosing casing through which water is circulated and which is constructed in such manner that it may be economically operated and constructed at a low cost.

Another object of the invention is to provide an improved refrigerating machine in which the motor for driving the compressor is disposed in a chamber which is insulated from the surrounding space and in which provision is made for cooling the motor to prevent the heat therefrom passing to the refrigerated space.

Other objects of the invention will appear from the description of the apparatus.

The invention consists in the several novel features hereinafter set forth and more particularly defined by claims at the conclusion hereof.

In the drawings: Figure 1 is a perspective of a refrigerator embodying the invention. Fig. 2 is a vertical section through the refrigerating machine. Fig. 3 is a vertically transverse section taken on line 3—3 of Fig. 2. Fig. 4 is a section taken on line 4—4 of Fig. 2. Fig. 5 is a plan, the insulating hood around the motor being shown in section. Fig. 6 is a horizontal section taken on line 6—6 of Fig. 2. Fig. 7 is a section taken on line 7—7 of Fig. 2. Fig. 8 is a section taken on line 8—8 of Fig. 2. Fig. 9 is a sectional perspective of one of the compressor-cylinders and the check valve therefor, the valve being shown removed from the cylinder.

The invention is shown embodied in a refrigerating machine which is adapted to be disposed in a chamber heretofore utilized for containing ice, as exemplified by the chamber *a* of a refrigerator *b* illustrated in Fig. 1, although it is to be understood that certain features of the invention may be utilized in refrigerating machines which are not installed in the space to be refrigerated or a space in communication therewith. The invention is exemplified in a machine of that type in which the compressor, receiver and condenser are all contained within and cooled in a casing through which water or condensing liquid is adapted to flow. A machine of this type is set forth in an application filed by me July 15, 1915, Serial Number 39,971 and in the practice of said invention, it has been found important to eliminate joints and the passage of connections through the case and the insulating jacket around the case as much as possible, because of the difficulty in avoiding leaky joints.

A casing *c* comprises a front wall 14, a back wall 15, side walls 16 and 17, all of which are integrally formed of a single casting, a base plate 35 and a top-plate or wall 41. One feature of the invention consists in forming the compressor casing integral with the casing to simplify the construction and to reduce to a minimum the connections for fluids passing to and from the chamber and the parts therein. The compressor comprises a crank-case 18 and cylinders 19 for the working pistons 20, all of which are integral with the body of the casing. The connecting portion 21 between the cylinders 19 and the side wall 16 is provided with ducts 22 leading to the inlet side of the pistons 20 respectively and with an inlet 23, to which the suction line 24 for low pressure refrigerant line is connected by means of an elbow pipe section 25 and coupling 26. Each compressor piston 20 is provided with a check valve 27 through which the low-pressure refrigerant passes to the compression chamber during the back stroke of the piston. A check-valve 28 is slidably held adjacent the upper end of each cylinder 19 to close automatically during the back stroke of the piston and permit the compressed refrigerant to pass to a duct 29 in the compressor casing which leads to a condenser-coil 30. This coil is disposed within the casing c and is connected to duct 29 by a union coupling 31 and a pipe 32. The condenser coil 30 has its lower end connected to discharge into a receiver 33 which is disposed below the condenser in casing c. The high pressure side 34 of the refrigerant line is connected to the receiver, being extended through the bottom-plate 35 of the case c. The base plate 35 is secured to the body of casing c by screws 35ª, is provided with legs 36 adapted to rest upon the bottom of the chamber a of the refrigerator and is extended laterally as at 37 to form a base or support for a brine-tank 38 containing a refrigerating coil 39 which has its ends connected to the high pressure side 34 and the low pressure side 24 of the refrigerant line. A pressure-reducing valve 40 of usual construction is interposed between the refrigerating coil and the high pressure side 34 of the refrigerant line. The top of the casing c is formed by a plate 41 which is secured to the casing-body by screws 42. The bottom of the crank casing of the compressor is formed with an opening which is closed by a head 43 which is secured to the lower end of the crank case by screws 43ª. The upper ends of the compressor-cylinders are closed by a head 46 which is secured to the compressor casing by screws 46ª. The compressor pistons 20 are connected by pitman 44 to cranks on a shaft 45. One end of this shaft extends through a housing 47 which is integrally formed with the crank-case and the casing c. Said housing contains a bearing 48 and packing rings 48' and extends between the crank case and wall 15 and outwardly from said wall to receive the screw-ring 49 for operating a follower 50 to compress the packing rings 48' in the sleeve 47. The crank-shaft 45 is also journaled in a bearing head 52 which is removably secured to the front of the crank case by screws 53. At the front of head 52, the front wall 14 of casing c is provided with a head 54 removably secured to said wall by screws 55 to provide access to head 52 when it is desired to inspect or repair the crank-shaft or its bearings. An oil reservoir 56 is integrally formed with the casing c and the compressor-casing. A filling plug 57 is provided in the top of said reservoir and from the latter lubricant discharges through a duct 58 to the bearing and packing for the portion of crank-shaft 45 in housing 47. The casing c is adapted for containing and the circulation of water to cool and absorb heat from the compressor, condenser and receiver. The integral construction of the casing c, compressor-case and oil reservoir, materially simplifies and reduces the fluid tight connections and couplings necessary. A pipe 60 from a suitable source of supply conducts water to the circulating chamber in the casing c and extends through the bottom plate 35 to deliver the cooling water to the lower portion of the chamber in the inclosing case. A discharge pipe 61 for the cooling liquid is connected to the upper portion of the side wall 17 of the casing c and is adapted to carry off the water after it has circulated around the receiver, compressor, condenser and lubricant reservoir. This construction permits the water to be delivered to casing c under pressure to insure the cooling of the crank case, condenser and receiver.

For the purpose of adapting the machine for installation in the refrigerated space or chamber an inclosing jacket is fitted around the front, rear and side walls of the case. This jacket consists of an inclosing shell 83 having inner and outer walls between which a filling of insulating material 84 is placed. This jacket is formed to extend around the head 54, as at 85, so that access may be had to the case for inspection or repair of the crank shaft of the compressor. The rear of this jacket is formed to extend around the projecting portion of housing 48 for the crank shaft 45, as at 86. The bottom plate 35 of the inclosing case is covered with insulating material 87 which is held on the bottom face of the plate by a metallic covering 88.

An electric motor 62 is mounted on the top plate 41 and is inclosed within a hood 63 which comprises inner and outer walls with insulating material 64 therebetween. The rear wall 65 of this casing is provided with an opening 66 through which a bearing extension 67 on the motor extends to the outside and rear of the hood 63. The projecting end of the motor-shaft 68 is provided with a drive-pulley 69 on the outside of the hood. The crank shaft 45 is also extended to the outside of the case and provided with a pulley 70 adapted to be driven from the drive-pulley 69 by a belt 71. The front of the hood 63 is formed by a removable head 72 which permits removal of the motor from the hood without removing the hood. It will be understood that pulley 69 must first be removed from its shaft when the motor is to be removed from the hood. Hood 63 is extended to cover and insulate the top-plate 41 of the casing c.

In a refrigerating machine in which the motor is disposed in the refrigerating space in a refrigerator, it is important to prevent the heat from the motor from passing to the refrigerating space and for this purpose the insulating hood around the motor is provided. To further guard against the radiation of heat from the motor to the refrigerating space, the supply pipe 75 for the cooling liquid is extended through the hood 63 and is connected to a series of loop-coils 77 which extend back and forth around the motor-casing 62 and the discharge terminal 78 of this coil is connected by a coupling 79 to a pipe section 80 which is connected by a coupling 81 to the pipe section 60 which discharges the cooling liquid into the casing c.

It will be understood that suitable controlling mechanism will be provided for the motor and cooling liquid as well understood in the art.

When the motor 62 is running, pulley 69 will drive belt 71 and pulley 70 on the compressor-shaft. Refrigerant from the low pressure side of the refrigerant line entering the compressor-cylinders through coupling 25 will pass into the cylinders between the pistons and the check valves 28 through check valves 27 and be compressed in the cylinders and forced through valves 28, ducts 29 and the condenser coil 30 into the receiver 33. From the receiver, refrigerant will pass to the refrigerating coil 39 under control of the pressure-reducing valve 40. From the coil 39, the refrigerant passes to the suction side of the compressor. During this operation, cooling water will enter pipe 75, flow through the coil 77 to cool the motor and thence through pipe sections 78, 80 and 60 into the water chamber in the casing c where it will circulate around the compressor, receiver, condenser coil and lubricant reservoir and overflow through the pipe 61. The refrigerant coil 39 will chill the brine in the tank 38 which will cool the refrigerant compartments in the refrigerator, it being understood that cold air in compartment a will circulate through the compartments in the refrigerator.

The invention exemplifies an improved refrigerating machine in which the parts thereof are compactly arranged so that they will occupy little space which is advantageous in this class of machines, either when installed in a space in communication with the refrigerating chamber or outside thereof. By forming the compressor-casing integral with the casing through which water is circulated, the coupling connections between the crank case and the inclosing case are reduced to a minimum and leaky joints are avoided. If repair is necessary to any of the parts in the crank-case of the compressor, access may be had thereto by first removing the heads 54 and 52 and without disturbing any of the refrigerant or water connections, or the insulating jacket. If access should be desired to the upper ends of the compressor cylinders, it is only necessary to uncouple pipe 78 at union 79, remove the insulating hood 63, the coil 76 being removable with the hood. The top plate 41 will then be accessible for removal to render the heads 46 of the compressor-cylinders accessible. Coupling 31 between the condenser-coil and pipe 32 will then also be accessible. If repair, such as renders removal of the inclosing case necessary, is to be made, it is only necessary to disconnect union 26 and remove coupling elbow 25 after the hood 63 and plate 41 have been removed as aforesaid. When union 81 is uncoupled, the insulating shell 83 as an entity can be slipped upwardly off the casing c and upon removing the bolts 35′, said casing will be released for removal.

The invention thus exemplifies a machine which is simple in construction, can be readily disassembled, can be produced at a low cost and is adapted for installation in a refrigerator or compartment in communication with the refrigerated compartment.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In refrigerating apparatus, the combination of an inclosing casing adapted to contain water, a condenser in the casing, a refrigerant line, and a compressor comprising a crank case, a plurality of cylinders and pistons reciprocable in the cylinders, said crank-case, and cylinder being integrally formed with a wall of the casing.

2. In refrigerating apparatus, the combination of an inclosing casing adapted to contain water, a condenser in the casing, a refrigerant line, and a compressor comprising a crank-case, a cylinder, a piston reciprocable in said cylinder, the casing having a plurality of integral sides and the crank case and cylinder being integrally formed with said sides.

3. In refrigerating apparatus, the combination of an inclosing casing adapted to contain water, a condenser in the casing, a refrigerant line, and a compressor comprising a crank-case, a cylinder and a piston reciprocable in said cylinder, the crank-case having a complete surrounding wall integrally formed with the crank-case and cylinder.

4. In refrigerating apparatus, the combination of an inclosing casing adapted to contain water, a condenser in the casing, a refrigerant line, and a compressor comprising a crank-case, a cylinder and a piston reciprocable in said cylinder, the casing comprising a body made up of integral side walls, said crank-case and cylinder being integral with said side walls.

5. In refrigerating apparatus, the combination of an inclosing casing adapted to contain water, a condenser in the casing, a refrigerant line, and a compressor comprising a crank-case, a cylinder and a piston reciprocable in said cylinder, the casing comprising a surrounding wall integral with the crank-case and cylinder and having a duct in an integral portion thereof to connect the refrigerant line and the compressor.

6. In refrigerating apparatus, the combination of an inclosing casing adapted to contain water and comprising a body, a top-plate and a bottom plate, means for supplying water into the case, a receiver in the casing, a condenser in the casing, a compressor comprising a cylinder and a crank case above said bottom plate and integral with said body and a refrigerant line outside of the casing, the casing having a duct in an integral portion thereof to connect the refrigerant-line and the compressor.

7. In refrigerating apparatus, the combination of an inclosing casing adapted to contain water, an insulating jacket around the casing to adapt it for installation in a refrigerated space, a compressor comprising a casing integrally formed with a surrounding wall of the inclosing casing, means for supplying water into the case, and a refrigerant line outside of the casing, the casing having a duct in an integral portion thereof to connect the refrigerant-line and the compressor.

8. In refrigerating apparatus, the combination of an inclosing casing adapted to contain water and comprising a body and a separate bottom plate, a compressor comprising a case integrally formed with said body, means for supplying water into the case, and a refrigerant line outside of the casing, the body having a duct formed in an integral portion thereof to connect the refrigerant line and the compressor.

9. In refrigerating apparatus, the combination of an inclosing casing comprising integral side walls and a bottom wall to which the side walls are removably connected, said casing being adapted to contain water, means for supplying water to the case, a compressor entirely within said casing having a case integral with the side walls of the inclosing case, and a refrigerant line outside of the casing, the casing having a connecting portion between the compressor and one of the side walls containing a duct to connect the refrigerant line and the compressor.

10. In refrigerating apparatus, the combination of an inclosing casing having integral side walls and a bottom to which the side walls are removably connected, said casing being adapted to contain water, means for supplying water to the case, a compressor wholly within said casing and having a case integral with said side walls, a condenser and receiver within said casing, an insulating jacket around the case and under said bottom, and a refrigerant line outside of the casing, the casing having a connecting portion between the compressor and one of the side walls containing a duct to connect the refrigerant line and the compressor.

11. In refrigerating apparatus, the combination of walls forming an inclosing casing adapted to contain water, a compressor comprising a case integrally formed with one of the walls of the case, a removable head on the case and a crank shaft removable through said head, the inclosing casing being provided with a removable head to provide access to the crank-case head, means for supplying water to the casing, and a refrigerant line.

12. In refrigerating apparatus, the combination of walls forming an inclosing casing adapted to contain water, a compressor comprising a case integrally formed with one of the walls of the case and a removable head on the case and a crank shaft removable through said head, the inclosing casing being provided with a removable head to provide access to the crank case head, means for supplying water to the casing, a condenser in the casing, an insulating jacket around the casing, and a refrigerant line.

13. In refrigerating apparatus, the combination of an inclosing casing adapted to contain water, a compressor comprising a case integrally formed with the side walls of the inclosing casing, an integral connection between said case and said casing having a refrigerant duct therein, means for supplying water to the inclosing casing, and a refrigerant line connected to said duct.

14. In refrigerating apparatus, the combination of an inclosing casing adapted to contain water and comprising a body and a removable top wall, a compressor comprising a cylinder integrally formed with said body, a piston slidably mounted in the cylinder and a removable head at one end of the cylinder to provide access to the cylinder, means for supplying water to the inclosing casing, a condenser in the casing and a refrigerant line connected to the compressor.

15. In refrigerating apparatus, the combination of an inclosing casing adapted to contain water, a compressor in the casing comprising a crank shaft, a lubricant reservoir for supplying lubricant to the crank shaft, integrally formed with the inclosing casing, means for delivering water into the inclosing case, and a refrigerant line.

16. In refrigerating apparatus, the combination of an inclosing casing adapted to contain water and comprising a body, top and bottom, a compressor in the casing comprising a crank shaft, a lubricant reservoir for supplying lubricant to the crank shaft, integrally formed with said body, means for delivering water into the inclosing case, a condenser in the casing, and a refrigerant line.

17. In a refrigerating apparatus, the combination of a casing adapted to contain water, a compressor in the casing comprising a case and a crank shaft, a reservoir for containing lubricant for the crank-shaft integrally formed with the compressor case, means for delivering water into the casing, and a refrigerant line.

18. In a refrigerating apparatus, the combination of a casing adapted to contain water, a compressor in the inclosing case and comprising a case integral with a wall of the casing and a crank-shaft, a reservoir for containing lubricant for the crank shaft, integrally formed with the compressor-case and inclosing casing, means for delivering water into the inclosing case, and a refrigerant line.

19. In refrigerating apparatus, the combination of an inclosing casing adapted to contain water, a compressor and a condenser disposed in the casing, means for delivering water into the inclosing case, an electric motor for driving the compressor outside of the casing, insulating means around the inclosing casing, an insulating hood around the motor, and a refrigerant line outside of the casing.

20. In refrigerating apparatus, the combination of an inclosing casing adapted to contain water, a compressor and a condenser disposed in the casing, means for delivering water into the inclosing casing, an electric motor for driving the compressor disposed on top of the case, insulating means around the inclosing case, an insulating hood around the motor, and a refrigerant line outside of the casing.

21. In refrigerating apparatus, the combination of an inclosing casing adapted to contain water, a compressor and a condenser disposed in the casing, means for delivering water into the inclosing casing, an electric motor for driving the compressor disposed outside of the case and mounted thereon, insulating means around the inclosing case, an insulating hood around the motor provided with means to permit removal of the motor without disconnection of the hood, and a refrigerant line outside of the casing and connected to the condenser.

22. In refrigerating apparatus, the combination of an inclosing casing adapted to contain water, a compressor and a condenser disposed in the casing, means for delivering water into the casing, an electric motor for driving the compressor disposed on top of the casing, insulating means around the inclosing case, a removable insulating hood around the motor, and a refrigerant line outside of the casing and connected to the condenser.

23. In refrigerating apparatus, the combination of an inclosing casing adapted to contain water, a compressor in the case, a condenser in the case, a motor for driving the compressor, an insulating jacket around the motor, means for circulating cooling liquid around the motor, and a refrigerant line outside of the casing.

24. In refrigerating apparatus, the combination of an inclosing casing adapted to contain water, a compressor, a condenser disposed within the case, a motor for driving the compressor, a coil around the motor, means and connections for causing water to flow successively through said coil and through the inclosing case, and a refrigerant line.

25. In refrigerating apparatus, the combination of an inclosing jacketed casing adapted to contain water, a compressor, a condenser disposed within the case, a motor for driving the compressor, a jacket around the motor, a coil within the jacket, means and connections for causing water to flow through said coil and through the casing, and a refrigerant line.

AUGUST P. ANDERSON.